United States Patent [19]
Ingram

[11] Patent Number: 5,799,474
[45] Date of Patent: Sep. 1, 1998

[54] BABY GREENS HARVESTER

[75] Inventor: Lawrence L. Ingram, Salinas, Calif.

[73] Assignee: Tanimura & Antle, Inc., Spreckles, Calif.

[21] Appl. No.: 694,047

[22] Filed: Aug. 7, 1996

[51] Int. Cl.⁶ ............................................. A01D 34/04
[52] U.S. Cl. .......................... 56/14.5; 56/17.1; 56/119; 56/327.1
[58] Field of Search ................... 56/327.1, 328.1, 56/16.4 R, 119, 14.5, 121.4, 121.46, 181, 184, 185, 327.2, 16.6, 17.1

[56] References Cited

U.S. PATENT DOCUMENTS

| Re. 34,678 | 8/1994 | Fischer et al. ............... 56/12.9 |
|---|---|---|
| 94,251 | 8/1869 | Smith et al. . |
| 209,639 | 11/1878 | Ainsworth ................. 56/185 X |
| 1,177,475 | 3/1916 | Boyd ............................ 56/184 |
| 1,243,095 | 10/1917 | Patterson . |
| 1,545,900 | 7/1925 | Henton . |
| 2,585,416 | 2/1952 | Weid et al. ................. 55/107 |

(List continued on next page.)

FOREIGN PATENT DOCUMENTS

| 2569941 | 3/1986 | France ..................... 56/327.1 |
|---|---|---|
| 9309661 | 5/1993 | WIPO ..................... 56/327.1 |

OTHER PUBLICATIONS

Machines Simon, Product Brochure: "L'inventeur du Cultirateau invent le nouveau cultirateau"; 4 pp.; No date, believed circa 1996; (in French).
Simon, Ateliers De Claire Fontaine, Product Brochure: "Cultirateau, Vegtable Growing Type Bed Cultivation, Patented Model GCP"; 4 pp.; No date, believed circa 1996; ( in 3 languages).
Machines Simon, Product Brochure: "Cultirateau M. Market Gardening Type", 2 pages; no date, believed Circa 1994 or earlier; ( in 4 languages).
Simon brochure on corn Salad Harvester, circa 1996.

Rehkugler, G.E., Shepardson, E.S., Pollock, J.G., "Research and Development of a Cabbage Harvester." Paper 68–102. 1968 Annual Meeting of Am. Society of Agricultural Engineers, Jun. 18–21, 1968 at Utah State University, Logan, Utah.

(List continued on next page.)

Primary Examiner—Heather Shackelford
Attorney, Agent, or Firm—Jacques M. Dulin, Esq; Heller Ehrman White & McAuliffe

[57] ABSTRACT

A baby greens harvester (10) for the harvesting of small salad vegetables known as baby greens (55). The baby greens harvester (10) has a chassis (12) with a packaging bed (18) thereon. A cutter/conveyor assembly (30) is affixed to the chassis such that the cutter/conveyor assembly (30) can rotate somewhat, relative to the chassis (12) about a longitudinal pivoting axis (102) and a generally horizontal cutter/conveyor assembly pivoting axis (62). The cutter/conveyor assembly (30) has a bottom belt (34) and an opposing, spaced, generally parallel top belt (36). The special top belt (36), called a Hula belt, has a plurality of highly flexible fingers (130) for gathering the baby greens (55) as they are cut by a cutting bar (32) and further for gently holding the baby greens (55) on the bottom belt (34) as they are conveyed rearwardly and upwardly for delivery through a chute (63) into a produce box (64). The front of the cutter/conveyor assembly (30) rides on a gauge roller (56) such that the cutting bar (32) is maintained a preselected close distance (0–4 inches in ¼-inch increments) above a bed surface (54) whereon the baby greens (55) are grown. The speed of both belts are coordinated to each other within about ±5% so they travel in step upwardly from the cutter bar to the delivery chute. In turn, the belts are driven off the harvester drive wheels, and the belt travel rate (foot per minute) is matched to the forward motion of the harvester within the range of ±15% so the cutter bar does not mangle or mulch baby greens by multiply cutting them. The Hula belt travel path is designed to permit the fingers to descent into the growing greens from above, gently position them for cutting, and hold the cut greens on the lower transport conveyor belt without bruising them, and then disengage just before delivery via the chute.

32 Claims, 11 Drawing Sheets

U.S. PATENT DOCUMENTS

| | | | |
|---|---|---|---|
| 2,833,357 | 5/1958 | Lust | 171/37 |
| 2,855,058 | 10/1958 | Krier | 171/42 |
| 3,300,954 | 1/1967 | Barnes et al. | 56/327 |
| 3,328,943 | 7/1967 | Marmorine et al. | 56/327 |
| 3,380,237 | 4/1968 | Garrett | 56/327 |
| 3,460,326 | 8/1969 | Holm | 56/119 |
| 3,497,013 | 2/1970 | Baker | 171/38 |
| 3,589,117 | 6/1971 | Wadsworth | 56/327 R |
| 3,597,907 | 8/1971 | Neal | 56/208 |
| 3,628,317 | 12/1971 | Lederer | 56/219 |
| 3,651,961 | 3/1972 | Hayes | 214/6 |
| 3,698,164 | 10/1972 | Boone et al. | 56/10.4 |
| 3,821,987 | 7/1974 | Shepardson et al. | 171/61 |
| 3,827,503 | 8/1974 | Hansen | 171/38 |
| 3,858,660 | 1/1975 | Wadsworth | 171/57 |
| 3,988,098 | 10/1976 | Kato et al. | 425/224 |
| 4,171,129 | 10/1979 | Daley et al. | 271/6 |
| 4,234,045 | 11/1980 | Porter | 171/14 |
| 4,262,477 | 4/1981 | Turold et al. | 56/327 |
| 4,292,784 | 10/1981 | Abatti et al. | 53/391 |
| 4,359,106 | 11/1982 | Nevarez | 172/529 |
| 4,586,677 | 5/1986 | Nevarez | 242/86.8 |
| 4,735,367 | 4/1988 | Brutosky | 241/37.5 |
| 4,931,130 | 6/1990 | Biagiotti | 156/446 |
| 4,965,993 | 10/1990 | Butler et al. | 56/327 |
| 4,967,545 | 11/1990 | Fischer et al. | 56/12.9 |
| 5,083,417 | 1/1992 | Jeronimidos | 56/9 |
| 5,209,305 | 5/1993 | Long | 171/7 |
| 5,237,795 | 8/1993 | Cheney et al. | 53/154 |
| 5,404,700 | 4/1995 | Kobuchi et al. | 56/327 |
| 5,428,946 | 7/1995 | Hansen | 56/27.5 |
| 5,464,032 | 11/1995 | Litterst | 134/72 |

OTHER PUBLICATIONS

Commercially available Jojoba Harvester, Color Copy of Documents D00385, 386, 387, 388, 389, 390, 391, 394, 396, 397 produced by Defendants on Sep. 12, 1996 in Tanimura & Antle, Inc. vs. Leroy Heile, Nevarez Enterprises, Inc. and Sonora Packing Company, Inc., U.S. District Court, N. Dist CA C96–20577s (Not Confidential –See copy of D00385).

Simon Salad Harvester, Edition Aout 1995 (Aug. 1995), 13 pp. * Safety Rules, * Setting Up the Machine * Operation Guide For The Cutting Device.

Simon, Cultirateau "GCP", Operation and Maintenance Guide, Spare Parts Catalogue, Ed. Jan. 1995 (in English, French and German), 26pp.

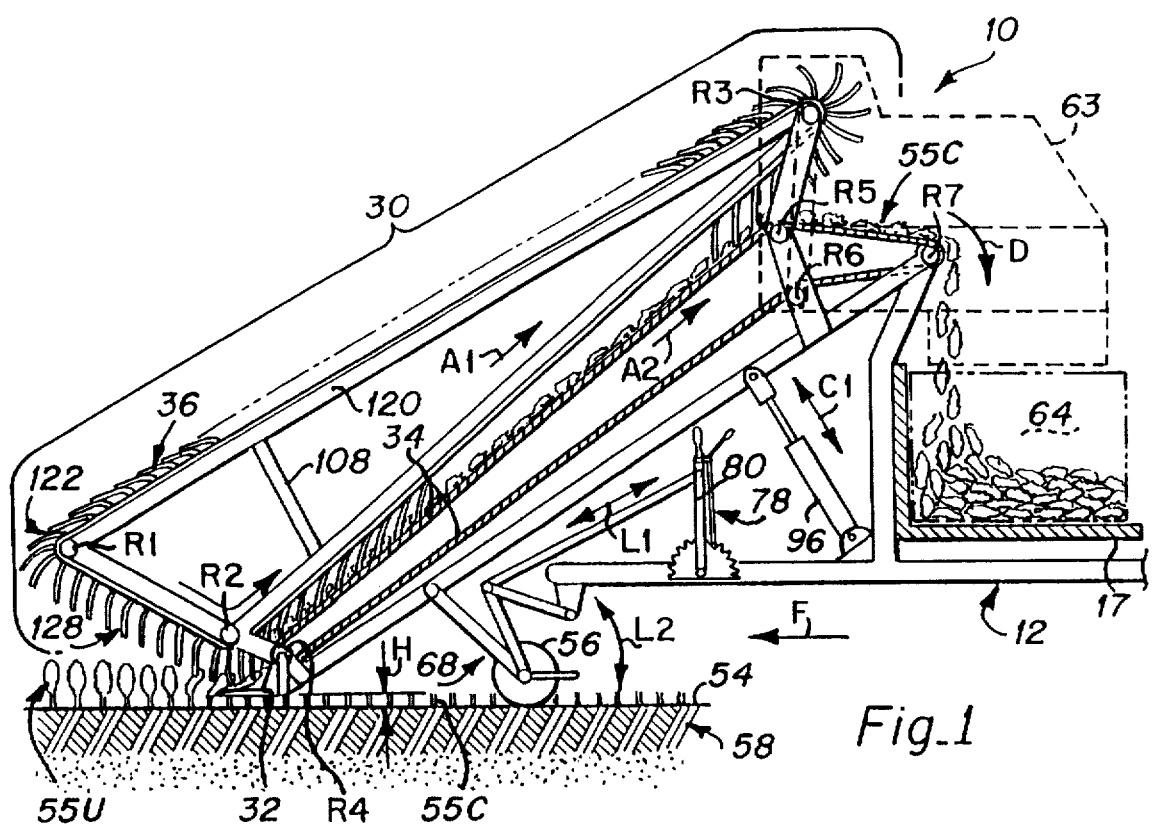
Fig_1
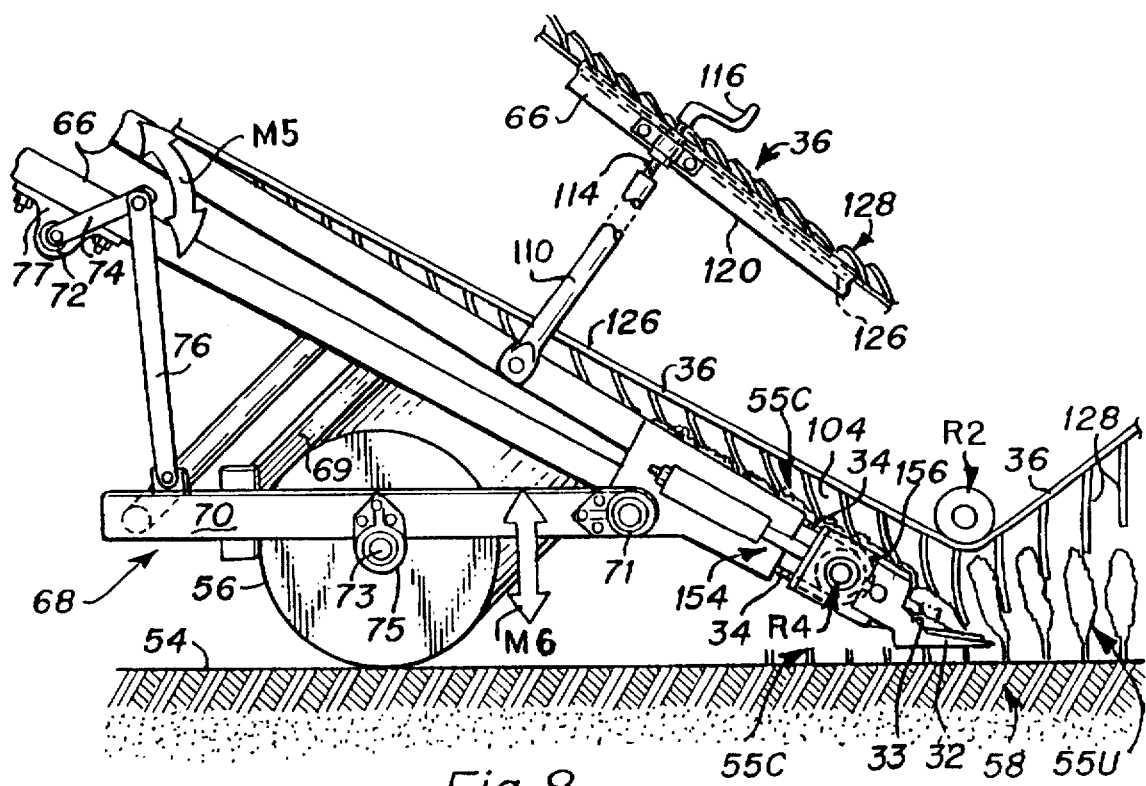
Fig_8

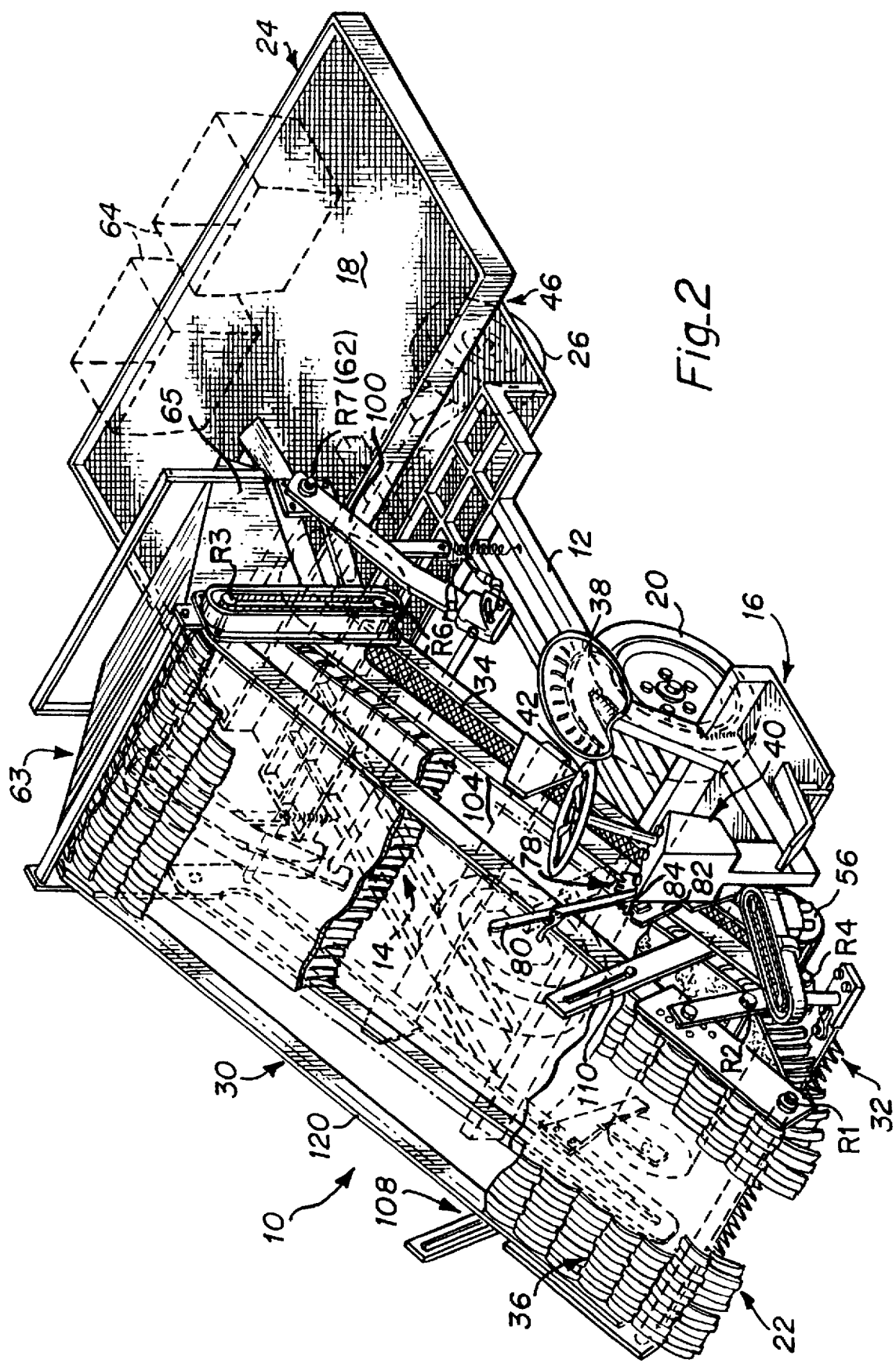
Fig_2

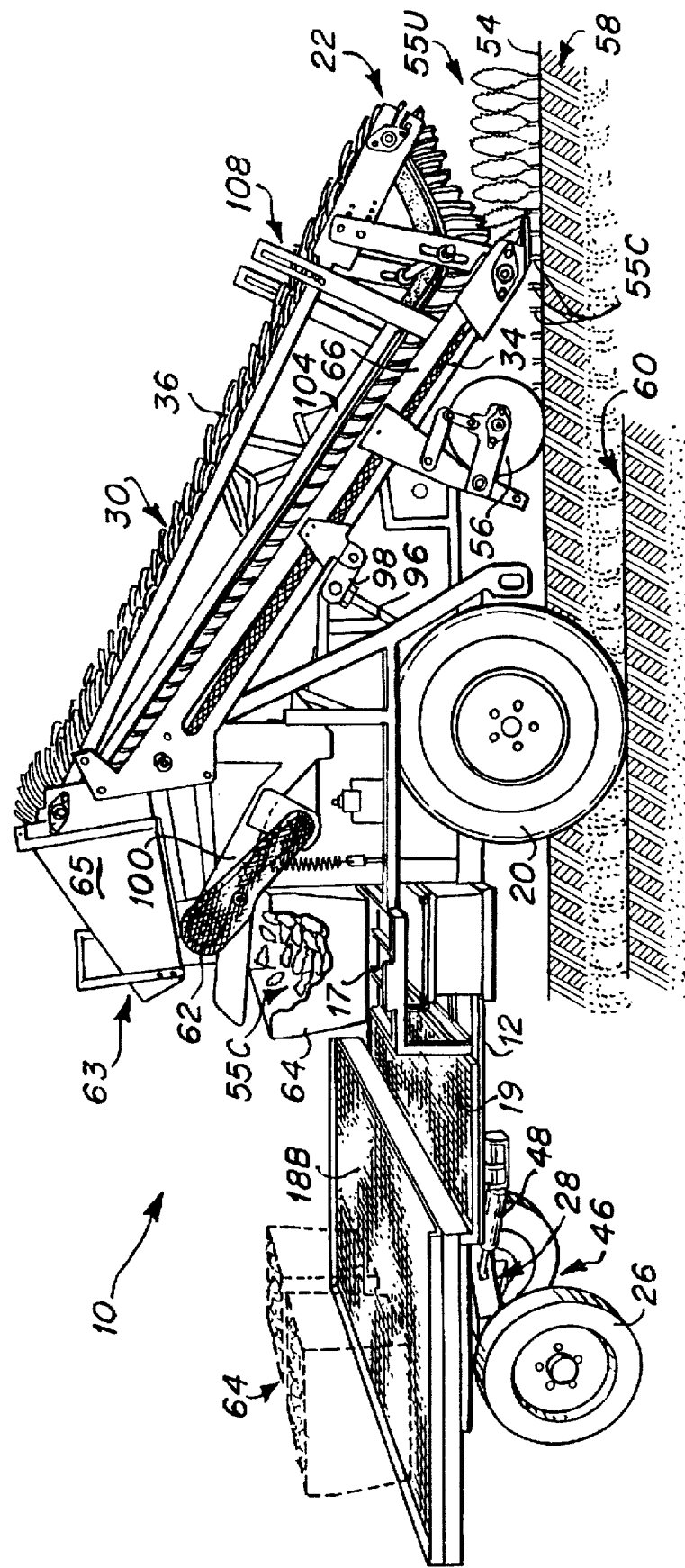
Fig_3

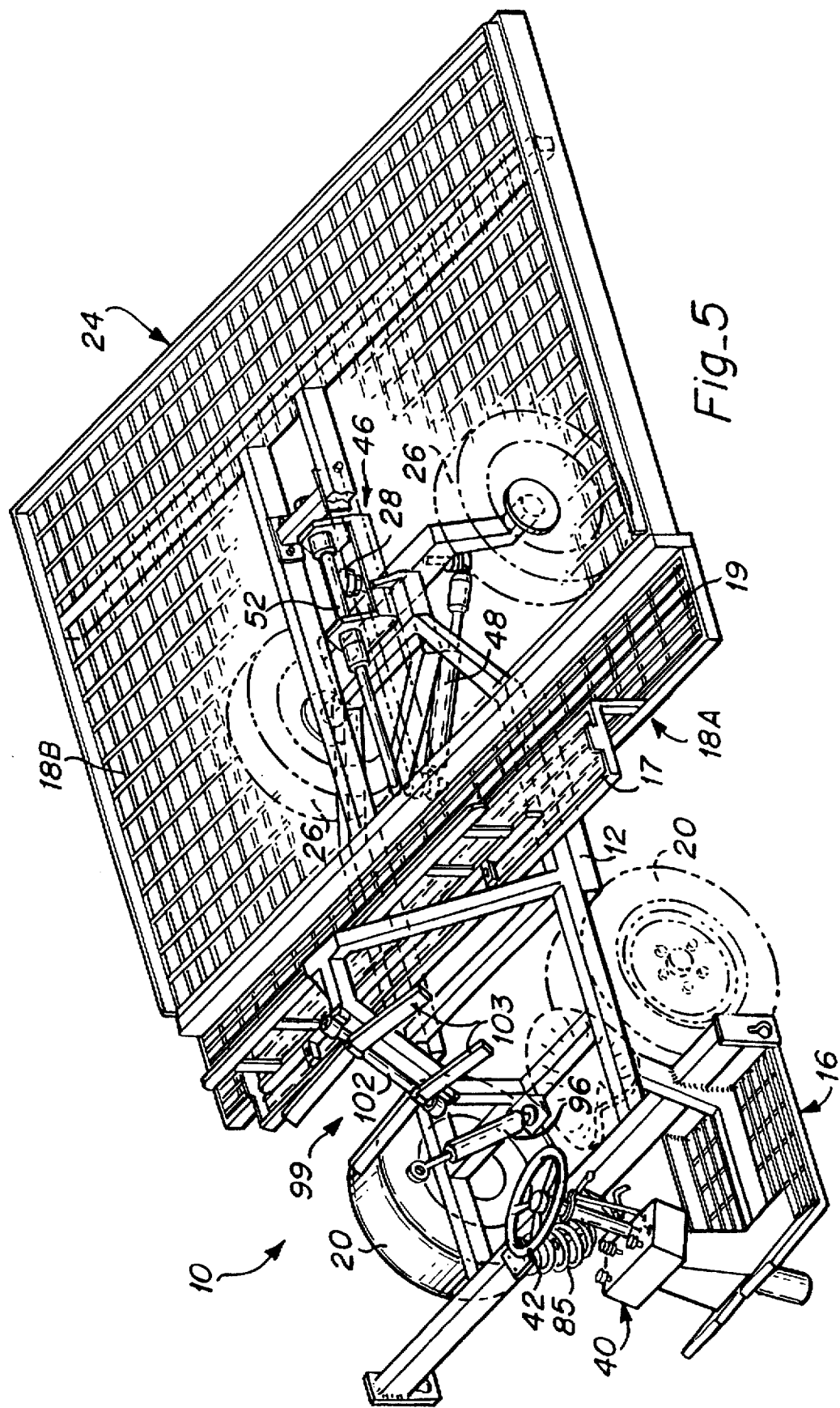

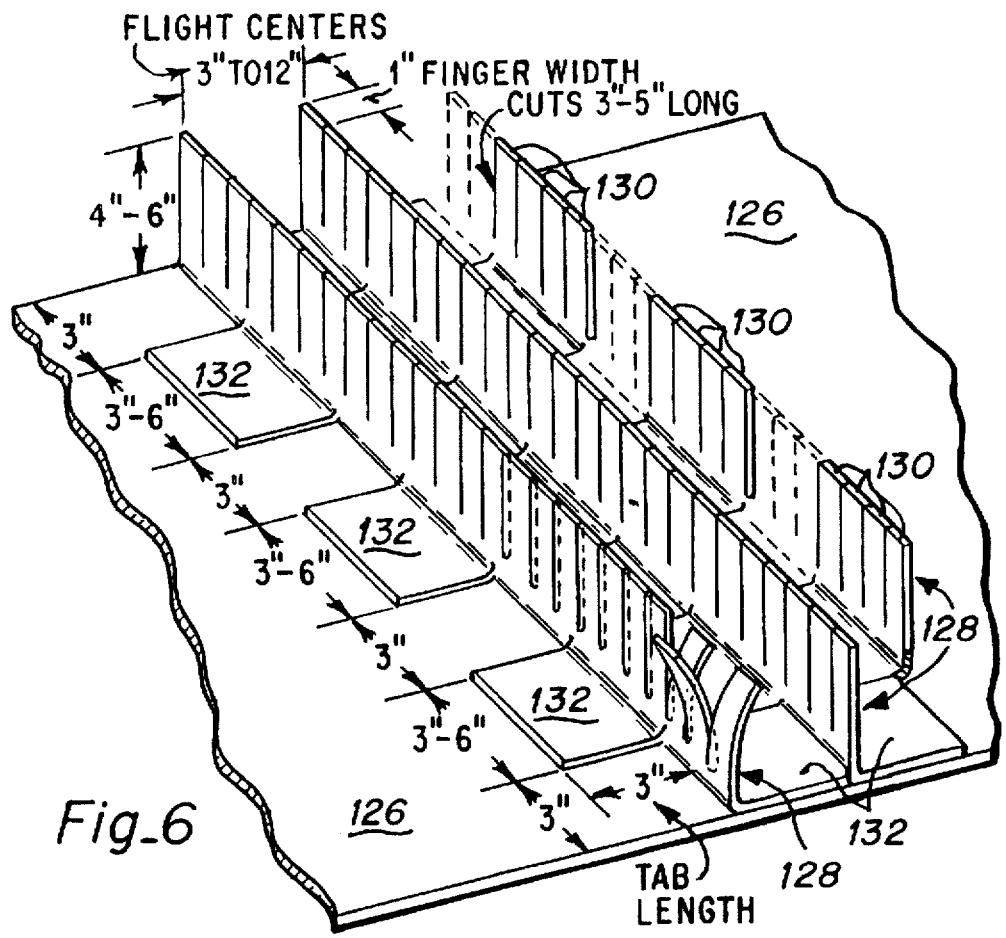
Fig_6
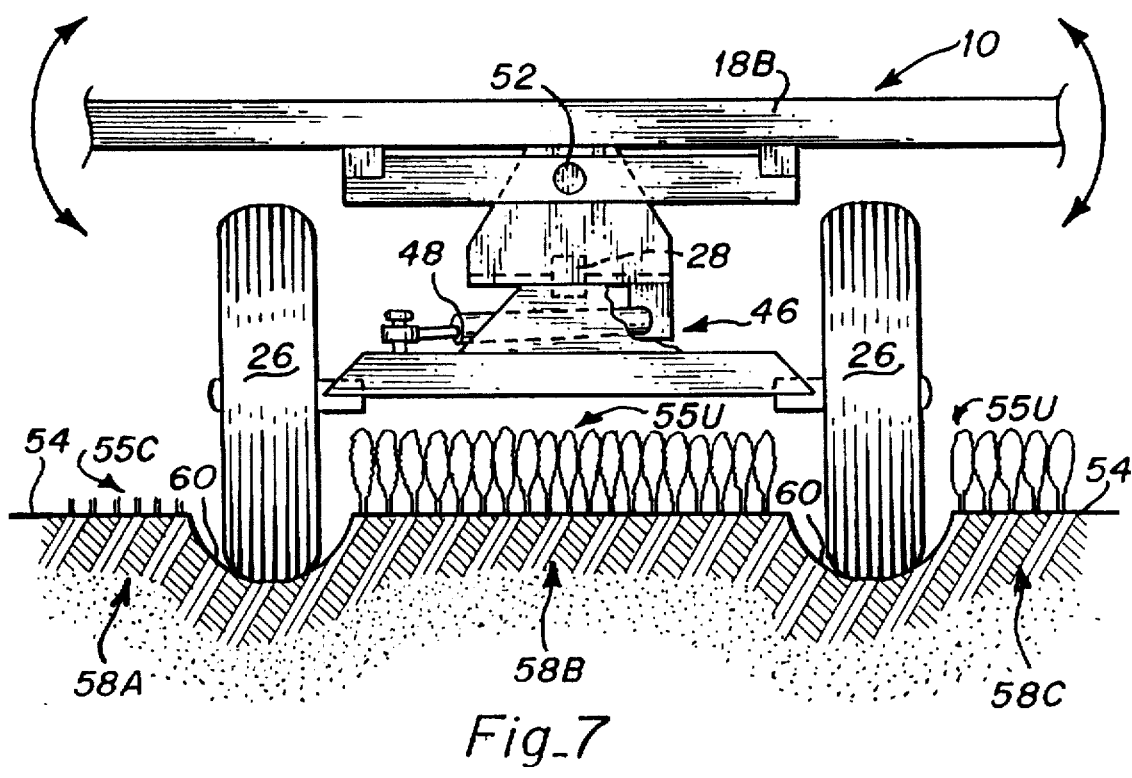
Fig_7

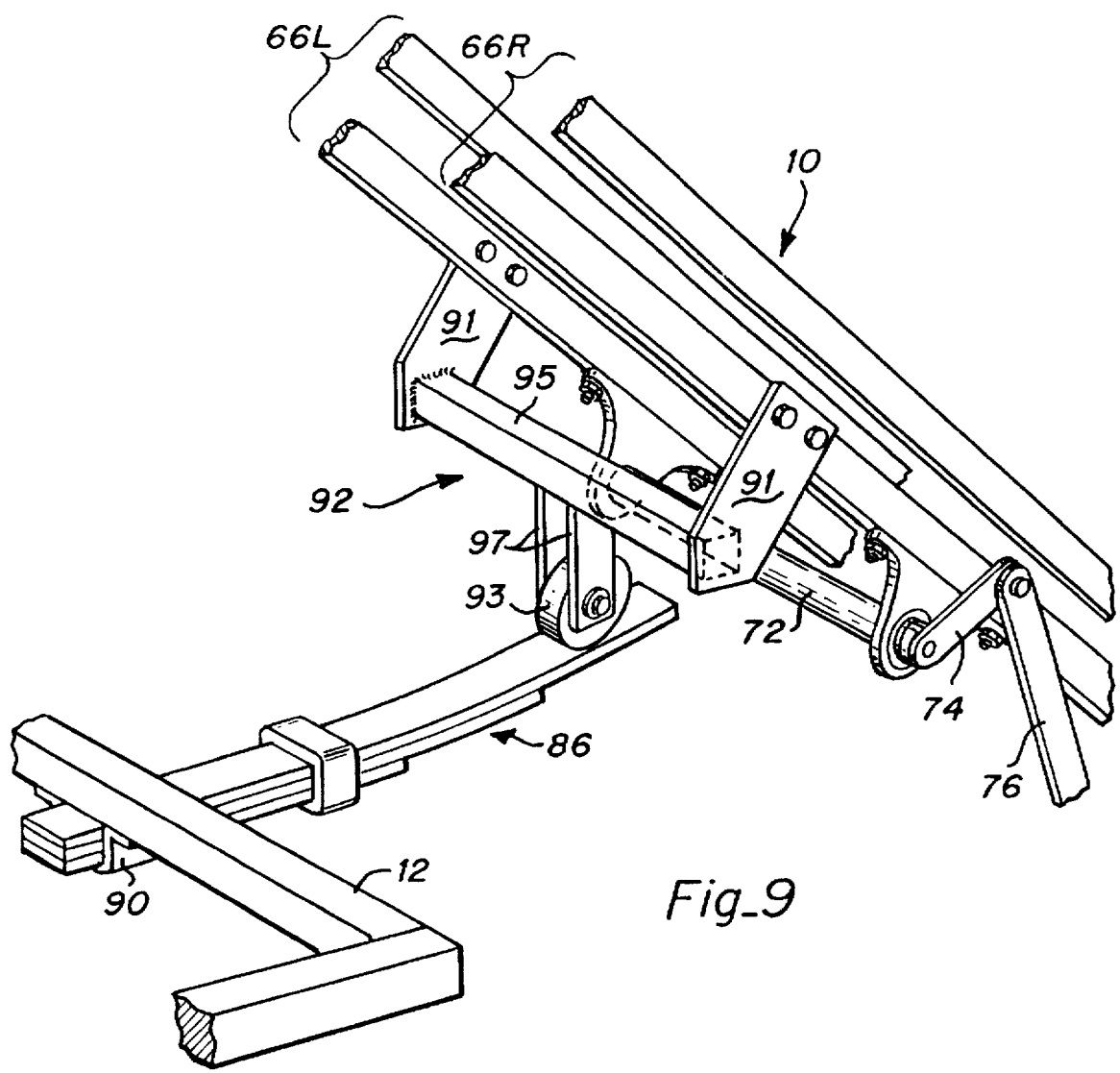
Fig_9

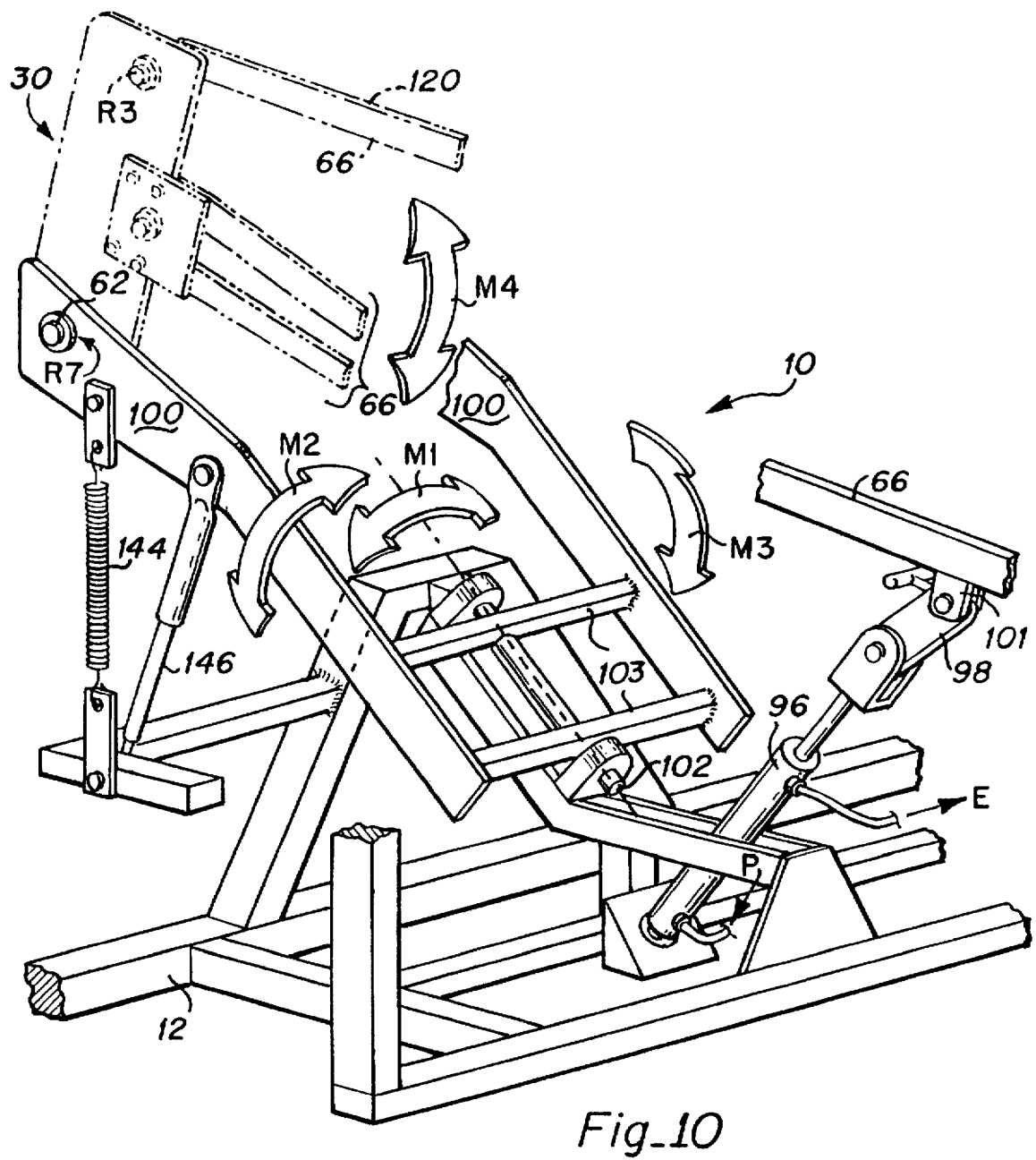
Fig_10

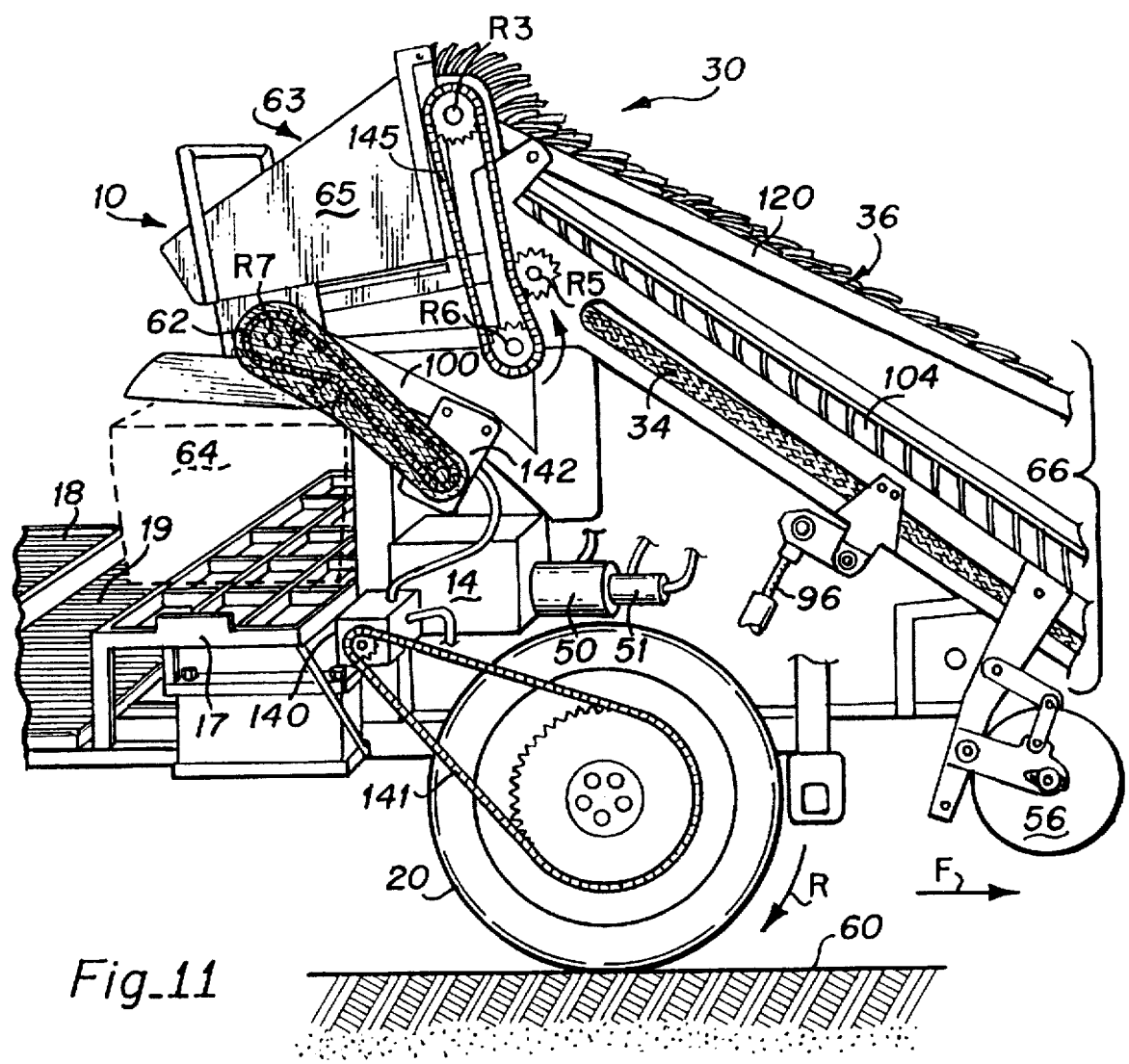
Fig_11

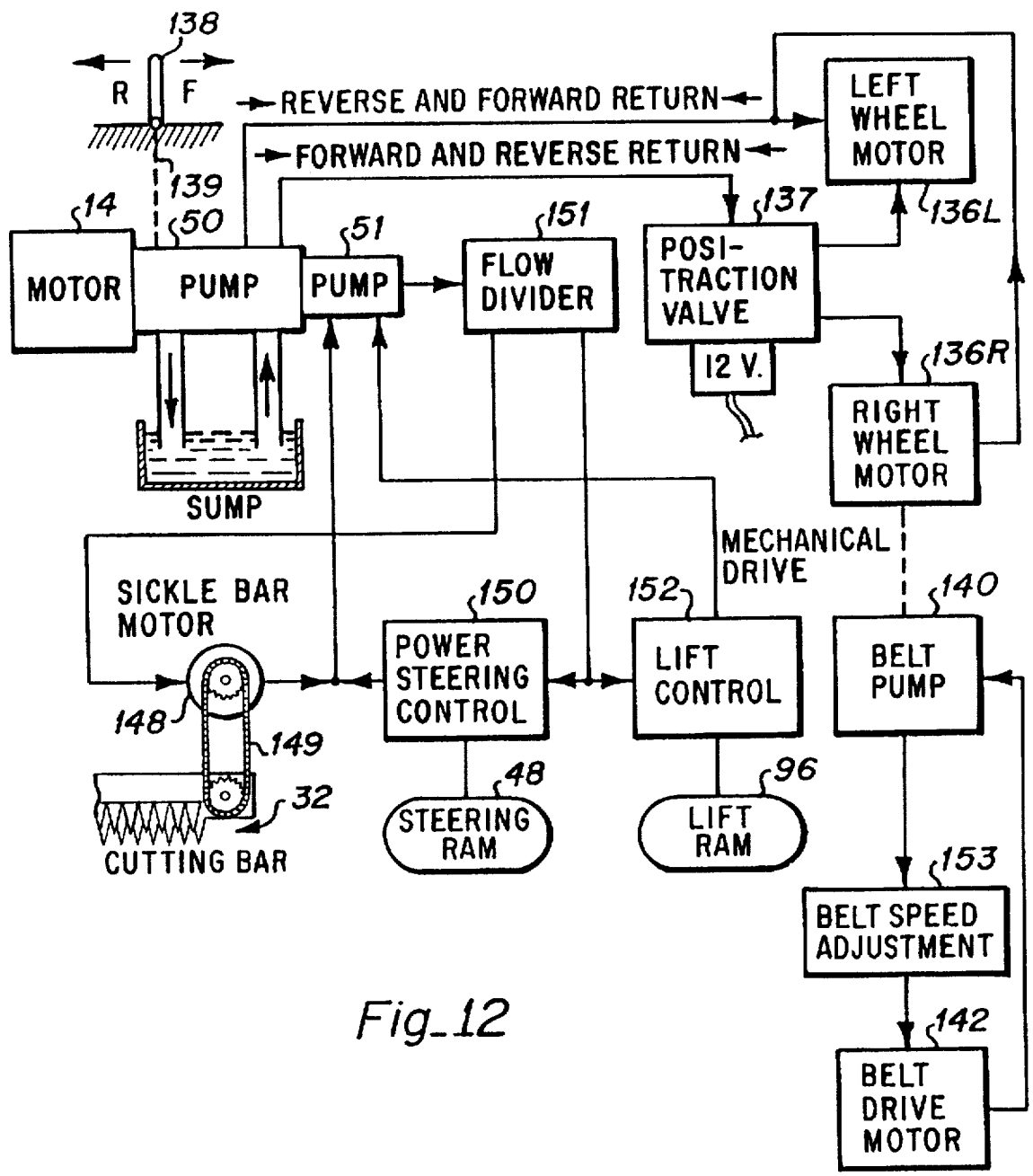
Fig_12

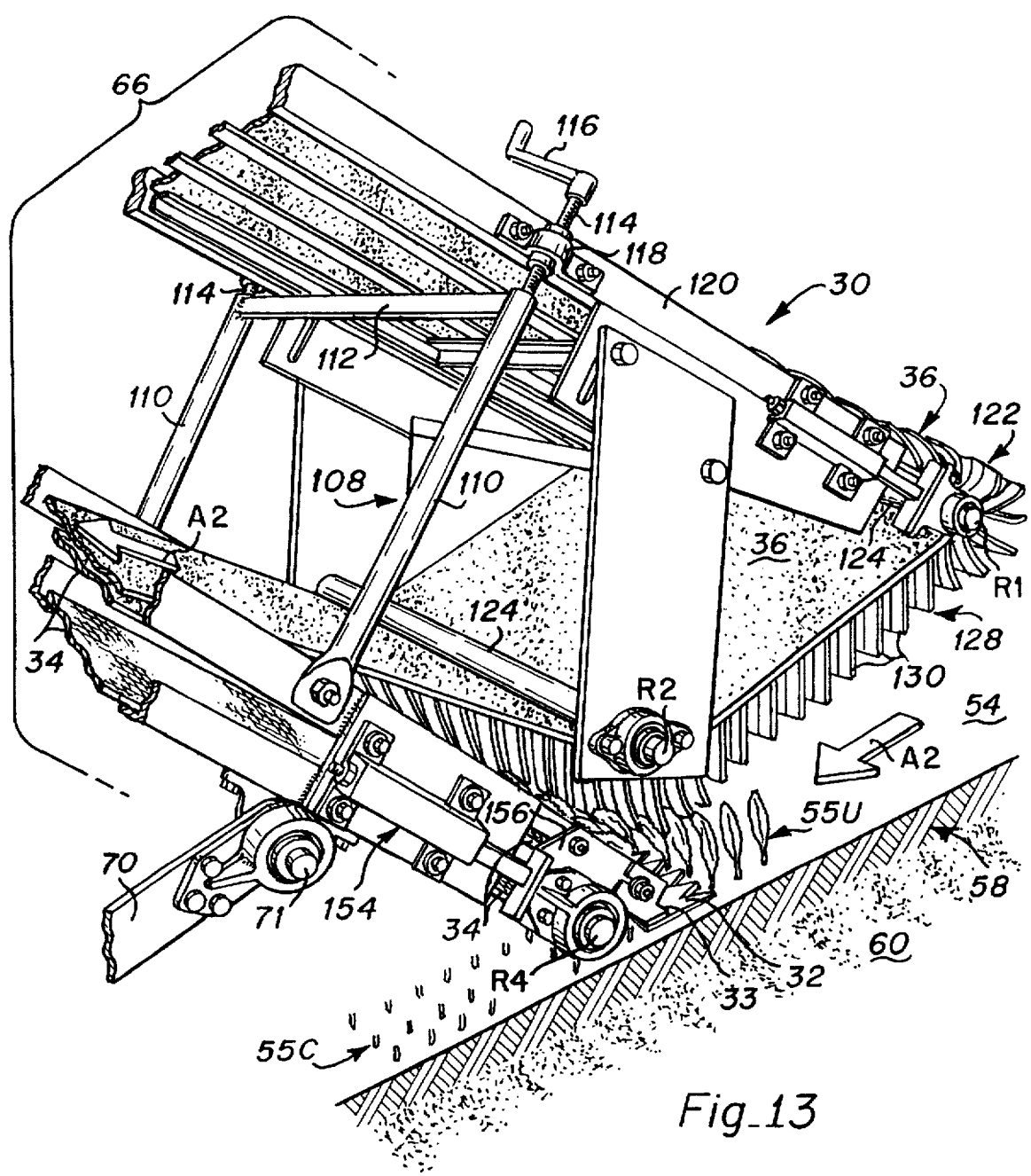
Fig_13

BABY GREENS HARVESTER

DESCRIPTION

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever. ©1996 Tanimura & Antle, Inc., All Rights Reserved.

CROSS-REFERENCE TO RELATED APPLICATIONS

This application discloses and claims as a regular application the subject matter disclosed in U.S. Provisional Application, Ser. No. 60/017,870, titled "BABY GREENS HARVESTER", filed May 14, 1996, by the inventor of this case, Lawrence L. Ingram. Priority of the filing date of May 14, 1996 is hereby claimed, and the disclosure of said Provisional Application is hereby incorporated by reference.

TECHNICAL FIELD

The invention relates to harvesters, and more particularly to mechanized self-propelled harvesters for cutting, conveying and loading baby greens into tote boxes in the field.

BACKGROUND ART

A wide variety of lettuce-type greens including tango, lolla rosa, red oak leaf, baby romaine, green oak leaf, baby red romaine, baby leaf spinach, baby red chard, red mustard, Totsoi, Mizuma, Frisee, arruagula, radicchio, and curly endives are currently grown, and are known in the trade under the term "baby greens". They are used for mixed or one of a kind salads and garnishes. They are ordinarily grown in raised beds which range in width from 36 to 48 inches between furrows. They are harvested well before maturity for freshness and tenderness. Current harvesting technique is entirely manual, and involves the farm laborer kneeling, leaning across the bed and severing the stems adjacent the earth with a knife or sickle. The laborer then places the severed greens by hand into carrying boxes called "totes" which are stacked in pallets, typically 24 totes per pallet. This work is, to say the least, hard on the knees and back, grimy, sweaty and unappealing. Typical harvesting rates are approximately 4 person-hours to produce 20 totes. The preferred cutting time is usually from 6:00 or 7:00 to 10:00 in the morning, after which it may become too hot as the cut greens wilt too fast to be a useful product. Thus, in a 3-hour "cutting day" or "cutting period" one worker produces only 15 totes, or about less than 75% of a pallet.

Shelf life is critical to greens marketing. It takes considerable time from harvest for the greens to pass through processing and distribution to market, and wilted and bruised greens are unsalable. In turn, gentle handling is a key to long shelf life. While great care is taken to process, transport and display lettuce and other greens under refrigerated conditions, these steps do not address the initial problem of bruising, tearing, scraping and pinching during harvesting. To minimize damage, greens must be severed without pulling, tearing or shredding, and must be handled gently in the field. Greens crush and bruise easily, and subsequently wilt and discolor to brown within a matter of hours. For example, on a cool day the wilting/discoloration is well along within three hours, and on an 80° F. day, within two hours. If the greens are damaged during harvesting, downstream gentle handling does not reverse the initial damage. The longer a delay in getting greens from the field into processing, the worse the problem.

There are a wide variety of self-propelled harvesters and pickers, but there are none specially designed to handle the extremely fragile and wilt-prone baby greens, which are a specialty produce. For example, the "Dalgety" harvester, shown in U.S. Pat. No. 4,967,545 of Fischer et al. (1990), is a towed machine for harvesting full grown spinach. It employs a sickle bar mounted on a wheeled frame and a single continuous air permeable belt (typically 15% open area) from a point behind and above the sickle bar to a higher rearwardly located point. The belt is covered by a housing. A fan is disposed below the belt and operates as a vacuum plenum to suck cut greens onto the belt where they adhere while they are being transported upwardly and rearwardly by the belt to be discharged into receiving containers or a side discharge conveyor. This machine has not proven especially popular, at least in part due to the fan requirement, the suction from which results in fragile greens being bruised by being drawn into or partly through the belt foramina. Also, once a greens leaf covers belt openings, the suction is substantially reduced or lost altogether, and the carrying capacity of the belt is correspondingly reduced or nullified. The downward fan discharge also can produce large qualities of dust that contaminates cut produce, and adjacent rows of uncut greens.

With the increased emphasis on healthy choice in food, it would be beneficial to have an automated self-propelled greens harvester which could be more productive and result in a more efficient harvesting of a fresher, less bruised product, while at the same time relieving workers of the back-breaking nature of hand labor.

DISCLOSURE OF INVENTION

It is among the objects and advantages of the invention to provide an automated, self-propelled harvester which is capable of severing and gently handling fragile produce such as baby greens, and transport them to a loading station wherein they may be loaded in standard field totes.

Still other objects and advantages include:

To provide a self-propelled four-wheel harvester having a special chassis in which the forward wheels are driven and the rear steerable, and mounted above and forwardly of the forward drive wheels is a cutter/conveyor assembly which is height adjustable with respect to the bed;

To provide a self-propelled hydrostatic drive field harvester which can be operated by a seated driver and which has a variety of adjustment features;

To provide a self-propelled harvester which includes a platform for a worker to shuttle tote boxes beneath a loading chute and for stacking the loaded totes on a load platform behind the worker at the rear of the vehicle;

To provide a control system for a baby greens harvester which includes control of the relative speed of motion of the two transport/collection belts, depending on the type of the greens produce being harvested;

To provide a drive system in which the drive wheels are hydraulically driven, and the drive of one or more of transport/collection belts are slaved off the drive wheels to permit the belt(s) to be synchronized to the forward motion of the harvester;

To provide a baby greens harvester unit having a forward mounted cutter/conveyor assembly which includes a terrain-following mechanism to maintain pre-set height above the bed top, and which is accurately pivoted along a longitudinal axis that is generally parallel to the transport/collection belt assembly to permit the cutter bar and conveyor belts to tilt around the axis from side to side to follow beds which may be canted; and To provide a baby greens harvester having a special chassis which is rear steerable, and having provision for a load platform mounted over the rear steering wheels which load platform is tiltable up and down from side to side around a horizontal axis generally parallel to but above the fore/aft axis of the unit to permit the unit to make tight turns.

Still other objects will be evident from the Figures, the Best Mode Description and the Claims hereof.

The baby greens harvester and harvesting method of this invention comprises a four-wheel, self-propelled, 5th wheel-type steerable chassis in which the forward wheels are driven and the rear are the steerable wheels. The wheelbase is essentially equal front and rear, is spaced to match the furrow spacing (one or more beds wide), and may be laterally adjustable for furrow spacing widths with appropriate spacers or axle lengths. A suitable engine, for example an internal combustion or propane engine, typically on the order of 20 to 30 horsepower, is mounted in any convenient place on the chassis as the vehicle is hydraulically driven. In the current best mode embodiment, the engine is mounted above the forward axle to one side of the vehicle center line. The vehicle can be adapted for electric power or other fuels (alcohol, gasohol, diesel, etc.).

Mounted on the mid-portion of the chassis and extending forwardly of the front wheels is a cutter/conveyor assembly. The chassis also includes provision for a driver's station or cab on either the right or left. In the present best mode, the driver's station is generally positioned forward of the two main drive wheels and cantilevered off the left side. A working and loading station platform is mounted to the chassis between the front and back wheels and extends over and rearwardly of the rear wheels. Included in this worker's station is a loading platform which permits the totes to be slid laterally into position beneath a loading chute, and from which a worker can move a full tote to be stacked on a stowage or stacking platform just behind the worker.

The cutter/conveyor assembly extends forwardly of the front drive wheels and has adjacent its lower leading edge a height and angle-adjustable cutter bar assembly, typically a double acting sickle bar. A bridgeplate is mounted just behind the cutter to span the distance between the sickle bar and a lower endless wire mesh conveyor belt. This lower belt is inclined upwardly from the cutter bar assembly to a delivery station having a load chute behind the driver. Spaced above the mesh conveyor belt, and generally parallel, although preferably with an increasing nip, is a handling and retainer belt of special flexible finger configuration. Together, the two belts, and the associated framework, rollers, drives, adjustment mechanisms, etc. comprise the cut greens transport/collection assembly. The belts travel in the same direction and are drive linked, to travel at the same speed, adjustable within about ±5%. Further, in the preferred embodiment, they are slaved off the main vehicle drive wheels so the belt travel is synchronized to the forward speed and motion of the vehicle. The two belts are inclined upwardly to deposit the cut greens at the delivery load station. The delivery load station includes a transparent protective windshield and a tapered chute to permit loading of the cut greens into tote boxes placed by the worker therebeneath. The framework for the conveyor belts is mounted on a yoke assembly which includes an inclined axle oriented generally parallel to the plane of the lower conveyor belt but spaced below it, and generally in a common vertical plane with the fore-aft axis of the greens bed or the vehicle chassis when not in a turning mode. This permits the sides of the entire cutter/conveyor framework and assembly to tilt up or down to follow any lateral transverse inclinations of the bed.

In addition, an adjustable support and gauge roller assembly is mounted to the cutter/conveyor assembly rearwardly of the front cutter bar but ahead of the front drive wheels. This roller assembly is pivotally height-adjustable by linkages to a lever mechanism secured to the chassis to permit the entire cutter assembly to follow the vertical contour of the bed while traveling in the longitudinal direction along the bed. This contour following support means is preferably a wide roller that spans substantially the entire width of the bed. By use of this roller assembly, the cutter bar can be controlled to cut to within about ¼ inches above the top of the bed. The cutter/conveyor assembly is also spring and/or shock absorber mounted from the vehicle chassis, preferably in the best mode embodiment by an axial cantilevered leaf spring behind the roller, and rear yaw dampers on the yoke comprising side springs and/or shock absorbers.

The engine powers both a hydraulic drive system for the forward drive to the wheels, and a hydraulic system for actuation of the various hydraulic cylinders or actuators to steer the vehicle, cause the conveyor belt drive sprockets to rotate, the cutter bar to oscillate, and operate the various levelling or height adjustment mechanisms.

BRIEF DESCRIPTION OF DRAWINGS

FIG. 1 is a schematic of the dual belt handling system of the harvester showing elevation control of the baby greens harvester of the invention;

FIG. 2 is an isometric view from the left front of the harvester;

FIG. 3 is a right side elevation view of the harvester;

FIG. 5 is a left front isometric view of the chassis;

FIG. 6 is an isometric view of the cut greens retainer belt and finger assembly (the Hula belt);

FIG. 7 is a rear elevation of a first embodiment of the trailing steering linkage and rear platform support;

FIG. 8 is an isometric detailed view of the gauge roller of FIG. 2, and related components;

FIG. 9 is an isometric detailed view of a leaf spring, according to the best presently known embodiment of the invention shown in relation to the cutter/conveyer assembly frame of FIG. 1;

FIG. 10 is an isometric detailed view of the yoke and ram and their associated components;

FIG. 11 is a side elevation detail of a portion of the hydraulic main drive and the slaved conveyor and Hula belt drives of the baby greens harvester;

FIG. 12 is a schematic of the hydraulic system of the inventive baby greens harvester; and FIG. 13 is an isometric view of the presently preferred best mode embodiment of the forward end of the cutter/conveyer assembly showing the front nip crank-type adjustment assembly and the roller(s) adjustment mechanisms.

BEST MODE FOR CARRYING OUT THE INVENTION

Figure 4:
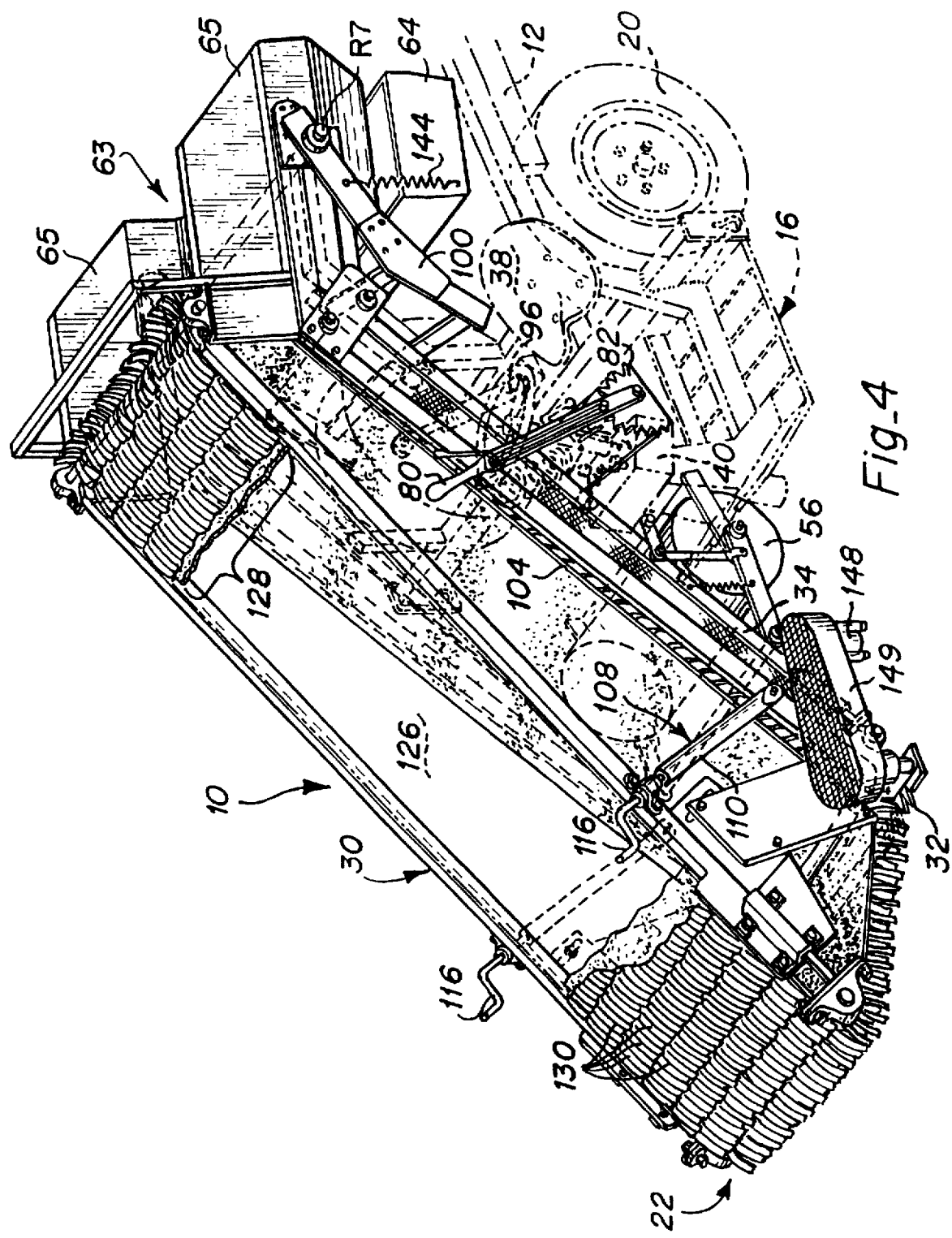
FIG. 4 is a left front isometric view of the cutter/conveyor assembly.

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

The invention is illustrated in the several figures, and the best presently known mode for carrying out the invention is a baby greens harvester optimized for the harvest: of small and delicate greens intended for salads, and the like. It will be appreciated that: the invention is of sufficient complexity that the many parts, interrelationships, and subcombinations thereof simply cannot be clearly or meaningfully illustrated in a single patent-type drawing. Accordingly, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing. For example, the best mode rear-steering mechanism will be shown separately from the best mode of the cutter/transport assembly.

FIG. 1 is a side elevation schematic of the cutter/conveyor assembly showing elevation control for adjusting and controlling cutting height, H, above surface 54 of a bed 58 of uncut baby greens 55U, and the transport/collection belts for handling and retaining the cut baby greens 55C as they are transported up from the cutting bar 32 to the hopper chute 63 and thence deposited in a produce box or tote 64. This schematic is introduced here to assist in focusing on key framework elements, pivots, linkages, and belt travel paths in the more detailed figures which follow. The baby greens harvester 10 includes a chassis 12, shown without wheels or motive power in FIG. 1, onto which is mounted a cutter/conveyer assembly 30 comprising a cutting bar 32, a lower (bottom) wire mesh transport conveyer belt 34 and an upper (top) greens-retaining belt 36. The two belts travel in parallel as shown by the arrows A1 and A2 around their respective rollers R1–R7.

The nip (spacing) between the forward ends of the top belt 36 and bottom belt 34 at forward rollers R2 and R4 is smaller than at the top rollers R3–R5 in the best mode embodiment; that is, the two belts diverge. The top belt 36 is informally called a "Hula belt" because of the many fingers 130 in each flight or finger strip row 128 (see FIG. 6), which serve to gently cradle the greens as they are transported upwardly by the lower mesh belt 34. Because the two belts are synchronized to travel at the same speed, ±5% or so (see belt speed adjustment control 153 in FIG. 12), and the fingers are very flexible and narrow, the finger strips 128 do not buckle, flip, or drag over the greens. Further, the relatively close spacing of the adjacent finger strips (the distance between flights), being on the order of 3–12 inches and preferably about 3–5 inches, prevent the cut baby greens from rolling back down the lower belt, which rolling action can result in bruising. There is no fan involved to hold the greens on the belt by suction or to transport them by blown air. The successive finger flights gently cradle the greens as they move upwardly, and the widening nip at the top caused by the divergent angles of the belts results in the fingers 128 gently releasing from the cut greens 55U just as the lower belt turns (breaks) horizontal at roller R6. Further, the top Hula belt 36 projects forwardly and above the cutter bar, and descends toward it. The inclined acute angle (to the horizontal) of the belt segment between rollers R1 and R2 permits the downwardly pendant fingers of the Hula belt to gently intersperse between and engage the uncut growing greens in synchrony with the forward motion of the harvester (arrow F), and sweep them gently back onto the cutting bar 32, across a narrow bridgeplate and onto the lower transport belt 34. (See also FIG. 13.)

The gauge roller 56 is mounted to the cutter/conveyor frame 66 (120) via gauge roller carrier assembly 68 (see also FIGS. 8 and 9). Arrows L1 and L2 show that by actuation of adjustment lever 80 mounted on chassis 12, the adjustment arm mechanism 78 permits close (¼ inch ) control of the height H above the bed. The harvester 10 can thus cut to within ¼ inch above the bed 58. Lifting ram 96 raises and lowers the entire cutter/conveyer assembly 30, e.g., for loading onto a transport trailer. The entire cutter conveyor assembly 30 is pivoted on the yoke at the rear adjacent R7, as will be discussed in more detail hereinafter in FIG. 10.

FIG. 2 is an isometric view of one embodiment of the inventive baby greens harvester 10 showing the chassis 12, driver's station 16, packaging bed 18 comprising the loading and stacking platforms, front drive wheels 20 and rear directional wheels 26 thereof, with the cutter/conveyor assembly 30 of FIG. 1 attached thereto. FIG. 3 is a right side elevation view of the inventive baby greens harvester 10 showing, from that perspective, one of the two front drive wheels 20, the directional wheels 26 and the associated directional wheel assembly 46 with a "fifth wheel" type steering mechanism 28 having a hydraulic steering ram 48 for controlling the direction of travel of the baby greens harvester 10, as will be discussed in more detail hereinafter in FIG. 7.

FIG. 4 is a left front isometric view of the forward end of an exemplary embodiment of the baby greens harvester 10 showing the best mode embodiment of the cutter/conveyor assembly with particular emphasis on the crank-type forward nip adjustment mechanism 110, 116 (See also FIG. 13), and the up-down arcuate pivoting of the entire cutter/conveyor assembly with respect to the yoke 100 at pivot R7 (M4 in FIG. 10). FIG. 4 also shows placement of the driver's station 16 (in phantom) in relation to the cutter conveyor assembly 30. FIG. 5 is a more detailed left front isometric view of the rear portion of the harvester 10 of FIG. 4, showing the loading platform 18a and the stacking platform 18b and related portion of the chassis 12, including the yoke assembly 100 (on which the cutter/conveyor assembly is mounted), and one embodiment of the rear steering assembly 28. FIG. 6 is an isometric view of the top belt (Hula belt) 36, which will be discussed in more detail hereinafter. FIG. 7 is a rear elevational view of the babes greens harvester 10 showing the directional wheels 26 and related steering components.

Referring again to the view of FIG. 2, it can be seen that the two front drive wheels 20 (of which one is visible in the view of FIG. 2) are located near a front end 22 of the baby greens harvester 10. Near a rear end 24 of the baby greens harvester 10 the two directional wheels are 26 rotatable as a unit about the "fifth wheel" type steering mechanism 28 for steering the baby greens harvester 10 (see also FIG. 7). In the best presently known embodiment 10 of the present invention, the cutter/conveyor assembly 30 has a cutting bar 32, a bottom belt 34 and a top cut greens retaining ("Hula") belt 36. A drive motor 14 provides motive and other power for the baby greens harvester 10, as will be discussed in more detail hereinafter (FIGS. 11 and 12).

The driver's station 16 has a seat 38 and controls 40 including a steering wheel 42. Except as specifically noted herein, the motor, steering, and hydraulic controls 40 are conventional. With the exception of important aspects which will be discussed in greater detail hereinafter, the construction of the chassis 12 is also of a conventional type of welded construction. While the chassis 12 could be made of metal tubes, or the like, or could be of essentially any general chassis type, in the best presently known embodiment 10 of the present invention, the chassis is constructed primarily from box tubes, and angle, U and flat stock, as depicted in the view of FIG. 2.

In the views of FIGS. 3, 5, and 7, it can be seen that the directional wheels 26, near the rear end 24 of the baby greens harvester 10, are rotatably attached to the directional wheel assembly 46. The directional wheel assembly 46 is rotatable, as a unit, about the "fifth wheel" type steering mechanism 28 by the steering ram 48. The steering ram 48 is controlled by the steering wheel 42 (FIG. 2) through conventional hydraulic steering mechanisms which are entirely conventional and which are omitted from the view of FIG. 3 for the sake of clarity. The drive motor 14 (FIG. 11) drives a primary hydraulic pump 50 for supplying motive power to the front drive wheels 20 and the belts slaved thereoff, and a secondary hydraulic pump 51 to supply hydraulic pressure for accessories via flow divider 151, such as the sickle bar, the steering ram 48 (controlled by the steering control 150 connected to steering wheel 42) and the lifting ram 96 (best seen in FIG. 10).

In the view of FIG. 7 it can be seen that the present best mode embodiment of the directional wheel assembly 46 rotates about the "fifth wheel" type steering mechanism 28 and further that the "fifth wheel" type steering mechanism 28 is free to rotate about a leveling or tilt axis pin or shaft 52 such that both of the directional wheels 26 general remain constantly in contact with the field surface 54 even when the field surface 54 may be canted or unlevel. FIG. 7 also shows an indefinite plurality of baby greens 55 in the form of the uncut baby greens 55U (the crop which is to be harvested by the baby greens harvester 10) growing upwardly from the surface 54 of bed 58.

Referring again to the perspective side view of FIG. 3, it can be seen that near the front end 22 of the baby greens harvester 10, the cutter/conveyor assembly 30 rides on a gauge roller 56. AS shown in FIGS. 1 and 3, the roller rides on surface 54 of bed 58 and the uncut greens 55U are gently guided to the cutter 32 and across bridgeplate 33 onto belt 34 (see FIGS. 8 and 13). The height of cutter 32 above bed surface 54 is exaggerated because of the scale of the drawing.

FIG. 8 is a more detailed view of one embodiment of the gauge roller 56 and related components. AS shown therein as the best presently known embodiment of the present invention, the gauge roller 56 is about 10 inches in diameter with its axis of rotation being located about 20 inches behind the cutter bar 32 (FIG. 3). This last dimension will vary somewhat as the relative angle of the cutter/conveyor assembly 30 changes. These two dimensions relating to the gauge roller 56 are a compromise between the following two factors: on the one hand, it is desirable to have the gauge roller 56 as near as possible to the cutter bar 32 such that the position of the cutter bar 32 will more closely follow the contour of that portion of the field surface 54 upon which the gauge roller 56 is setting. On the other hand, it is desirable to have the gauge roller 56 as large as possible to avoid the gauge roller 56 sinking into the field surface 54 when the field surface 54 is soft, and further to avoid extremely fine responses as the gauge roller 56 rolls over each little clod of soil or rock. However, one skilled in the art will recognize that the larger the gauge roller 56 is, the further back from the cutting bar 32 it must be positioned in order that the cutting bar 32 can be brought near to the field surface 54 while the bottom belt 343 still clears the gauge roller 56. The inventor has found that the above listed dimensions represent the best known compromise of these opposing considerations. In the best presently known embodiment 10 of the present invention, the gauge roller is approximately one width of the bed; thus, for a 30–36-inch wide bed the roller may range from about 24–36 inches wide. This is simply a function of the fact that the gauge roller is intended to ride on the field surface 54 of the bed 58 on which the baby greens 55 are grown.

As can be seen in the view of FIG. 7, the beds 58 alternate with furrows 60. In the part of the United States wherein the best presently known embodiment 10 of the present invention is intended to operate, the baby greens 55 are planted on 40-inch centers. Therefore, the front drive wheels 20 and the directional wheels 26 are spaced apart approximately 40 inches, center to center, from their corresponding members for a single bed wide machine. For a machine spanning two beds, the axle length is doubled for an 80-inch span. In other parts of the world, it is customary to plant the greens 55, and the like, on 42-inch centers, or similar variation. The dimensions of the baby greens harvester 10 would, in such applications, be adjusted accordingly.

Referring again to the view of FIG. 3, the cutter/conveyor assembly 30 rotates about a cutter/conveyor assembly pivot axis 62 (at R7, see FIGS. 1, 2, 4, and 10) such that, as the front of the cutter/conveyor assembly 30 moves up and down (as when the gauge roller 56 moves over an uneven field surface 54 or by other means to be discussed hereinafter), there is very little up and down movement of hopper chute 63 located at the rear discharge portion of the cutter/conveyor assembly 30 which is above the tote slideway 17 at the forward end of the packaging bed 18. This is for both the convenience and the safety of operating personnel. Excessive vertical movement of the back of the cutter/conveyor assembly relative to a produce box 64 placed on the slideway 17 would be, at the least, inconvenient and, at the most, quite dangerous, as a worker might get a hand caught between the produce box 64 and the chute 63. The chute 63 guides cut baby greens 55C into the produce box 64, and has side wings or wind shields 65 to prevent the baby greens 55C from being blown about the field, or the like, as they drop from the bottom transport belt 34 into the produce box 64.

The cutter/conveyor assembly 30 is built about a cutter/conveyor assembly frame 66, with the frame rear pivoting axis 62 passing through a support arm 100 of the yoke 99, as depicted in the views of FIGS. 2, 3, 5, and 10. AS can be seen in the detailed view of FIG. 8, the gauge roller 56 is attached to the cutter/conveyor assembly frame 66 through a gauge roller carrier assembly 68. The gauge roller carrier assembly 68 comprises gauge roller support arms 70 (one of which is visible in the view of FIG. 8) pivoted at their forward ends by bearing 71. The roller 56 is mounted on roller axle 73 journalled in bearing 75, mounted medially along arm 70 and is kept clean by scraper 69. A rotatable gauge height adjustment jack shaft 72 runs the width of the harvest mechanism frame 66 and is journalled in bearing 77. A gauge height adjustment arm 74 (one of the two of which is visible in the view of FIGS. 3, 8, and 9) is attached at each end of the jack shaft, which in turn is pivotally linked to a gauge height adjustment link 76 (one of which is visible In the view of FIG. 3) rotatably affixed thereto. Each of the gauge height adjustment links 76 is attached, at an end opposite its respective gauge height adjustment arm 74, to the corresponding rearward end of the gauge roller support arm 70. In light of the above, one skilled in the art can now appreciate that rotation of the gauge height adjustment jack shaft (via adjustment mechanism 78 on the other side of the harvester next to the driver as shown in FIGS. 1, 2, and 4), will vary the height of the roller 56 (arrow M5 in FIG. 8), and in turn adjust the height of the front of the cutter/conveyor assembly 30 when the gauge roller 56 is resting on the field surface 54. In the best presently known embodiment 10 of the present invention, the gauge height adjustment links 76 are turnbuckles, such that fine adjustments of the height of the front of the cutter/conveyor assembly 30 can be made by adjusting the gauge height adjustment links 76. This can add 2–4 inches to the cutter height adjustment capability.

Referring again to the view of FIGS. 1, 2, 4, and 8, adjustments of the height of the front of the cutter/conveyor assembly 30 are made by the adjustment arm mechanism 78 which is near to and readily accessible from the driver's station 16. (In FIG. 8, the roller is shown in the lowered road position, while the cutter 32 is shown as if the roller were raised in the harvesting position.) The adjustment arm mechanism 78 has an adjustment arm (lever) 80 which is rigidly affixed to the gauge height adjustment jack shaft. A conventional retractable pin mechanism 82 holds the adjustment arm in one of a plurality of notches 84 in the adjustment arm mechanism 78, as set by the operator of the baby greens harvester 10. The notches are spaced to provide ¼-inch increments in the adjustment of the height of the roller 56 so the cutter can be spaced from ¼ inch above the bed surface 54 up to about 4 inches. Together with the above noted turnbuckle adjustment, the cutter height can be adjusted to cut up to about 8 inches above the bed.

The inventor has found that it is undesirable to allow a great amount of weight to rest on the gauge roller 56, since this causes the gauge roller 56 to sink into the field surface 54, thereby causing the cutting bar 32 to go inoperably low, e.g., so low that the cutting bar 32 digs into the field surface 54 damaging the cutting bar 32. However, since the cutter/conveyor assembly 30 is, in use, supported primarily at the cutter/conveyor assembly rear pivoting axis 62 and at the gauge roller 56, and since these two support points are near the extreme ends of the cutter/conveyor assembly 30, then much of the weight of the cutter/conveyor assembly 30 would normally rest on the gauge roller 56. Thus, some of the weight needs to be taken off the front of the cutter/conveyor assembly.

Any of a number of different devices may be employed to take part of the weight off of the gauge roller 56. For example, in the embodiment depicted in FIG. 5, a coil spring 85 is shown being employed for this purpose. However, the inventor has found that a leaf spring 86, as depicted in the detailed view of FIG. 9, is the best presently known mode of support. The leaf spring 86 is rigidly affixed at one end to a rear fixture 90. The leaf spring 86 is a conventional leaf spring such as is found in an automobile suspension and in this embodiment is a half spring. The leaf rear fixture 90 is, in turn, rigidly affixed to the chassis 12 of the baby greens harvester 10. A leaf spring front roller bracket assembly 92 is rigidly affixed to the cutter/conveyor assembly frame 66. The roller bracket comprises side brackets 91 attached to opposed sides 66L and 66R of the frame 66, which carry cross bar 94 and spaced roller brackets 97 on which roller 93 is journalled. When the gauge roller 56 (FIG. 2) is resting on the ground, then the spring roller 93, which is rotatably affixed in brackets 97, will rest on the leaf spring 86, thereby relieving much of the weight of the cutter/conveyor assembly 33 from the gauge roller 56. Therefore, any tension on the leaf spring 86 tends to lift and slightly rotate the front of the cutter/conveyor assembly frame 66 about the cutter/conveyor assembly rear pivoting axis 62 (R7), which is shown as arrow M4 in FIG. 10, thereby relieving the amount of load on the gauge roller 56.

In order to transport the baby greens harvester 10, and to make turns, and the like, it is desirable to be able to easily lift the front of the cutter/conveyor assembly 30 well clear of the field surface 54. This is accomplished by the cutter/conveyor assembly lifting ram 96 as shown in FIGS. 1, 3, 4, 5, 10, and 11. As best seen in FIG. 10, the cutter/conveyor assembly lifting ram 96 is attached in any suitable and conventional manner at the bottom to the chassis 12. At the top of the cutter/conveyor assembly lifting ram 96, an isolation link 98 is rotatably affixed to the top of the cutter/conveyor assembly lifting ram 96 at one end and to the cutter/conveyor assembly frame 66 via brackets 101 at the other end of the isolation link 98. The purpose of the isolation link 98 is to disassociate normal up-down movement of the cutter/conveyor assembly 30 during field operations from the lifting ram 96, when the cutter/conveyor assembly 30 is lowered and resting on the gauge roller 56. Were it not for the isolation link 98, in such a condition, small vertical movements of the front of the cutter/conveyor assembly 3C would be countered by the lifting ram 96. That is, the cutter/conveyor assembly lifting ram 96 would act much in the manner of a shock absorber in such conditions. Since it is desired that the front of the cutter/conveyor assembly 30 closely follow the terrain of the field surface 54, this would be an undesirable condition. While there are available hydraulic rams which are designed to move freely when retracted to account for just this sort of problem, the available examples still tend to provide some undesired stop action. Therefore, the inventor has found the solution provided by the isolation link 98, as described herein, to be the present best mode embodiment.

As has been previously discussed herein, a cutter/conveyor assembly pivoting axis 62 is located near the rear of the harvesting mechanism frame 66 as best seen in FIG. 10, the cutter/conveyor assembly frame 66 is free to rotate through a limited arc relative to side arms 100 of the yoke 99. The cutter/conveyor assembly pivoting axis 62 passes through both arms 100 of the yoke 99. The yoke assembly 99 includes cross arms 103 mounted on a longitudinal pivoting axis 102 to allow for limited rocking motion (shown by arrows $M_1$, $M_2$, and $M_3$) of the cutter/conveyor assembly 30 relative to the longitudinal pivoting axis 102. This allows the entire cutter/conveyor assembly 30 to tilt somewhat side to side as the gauge roller 56 rolls over canted field surface 54. In the best presently known embodiment 10 of the present invention, both the cutter/conveyor assembly pivoting axis 62 and the longitudinal pivoting axis 102 are implemented as conventional wrist pin assemblies. The axle 102 is generally parallel to the lower belt 34 and lies in a vertical plane which, in a single bed embodiment, includes the center longitudinal axis of the harvester.

As can be seen in the view of FIG. 10, at each side of the cutter/conveyor assembly 30 includes a yaw spring 144 and a yaw shock absorber 146 (only one yaw spring 144 and one yaw shock absorber 146 are visible in the view of FIG. 10). The yaw springs 144 tend to center the yaw motion of the cutter/conveyor assembly 30 and the yaw shock absorbers 146 tend to stabilize (dampen) such movement to prevent rocking motion of the cutter/conveyor assembly 30 as the gauge roller (FIG. 2) rolls across the field surface 54.

Referring again to the view of FIGS. 2–4, 8, and 13, the passage or space between the bottom belt 34 and the top belt 36 defines a produce channel 104 through which the cut baby greens 55C pass from the cutting bar 32 to the chute 63 at the upper rear of the cutter/ conveyor assembly 30. As the cut baby greens 55C exit the produce channel 104, they are discharged through the chute 63 into the produce box 64 on the slideway 17. The height of the produce channel 104 (that is, the distance between the bottom belt 34 and the top belt 36) at the front of the produce channel 104 is adjustable using a produce channel height adjustment mechanism 108. In FIGS. 2 and 3, the adjustment is via a bolt and slot in member 110. In FIGS. 4, 8, and 13, a crank assembly is shown. In the alternative, a hydraulic cylinder can be used.

FIG. 13 is a more detailed view of a portion of the produce channel height adjustment mechanism 108. As best illustrated in the views of FIGS. 3 and 13, the produce channel height adjustment mechanism 108 has a pair of upright tubes 110, one is rigidly affixed to each side of the cutter/conveyor assembly frame 66L and 66R, respectively. A cross bar 112 is provided between the tops of the upright bars 110 and serves to hold the uprights 110 in their positions relative to the each other. The top portion of each of the uprights 110 receives one of a pair of threaded adjustment rods 114 such that the adjustment rod 114 is free to turn within its upright bar 110, yet is restrained from traveling up or down through the upright bar 110. A crank handle 116 is provided at the top of each of the adjustment rods 114 and two threaded adjustment nuts 118 are affixed, one at each side, to a top belt frame member 120 (part of the frame 66). The top belt frame 120 provides the framework about which the top belt 34 moves during its descent to RI. One skilled in the art will recognize that the produce channel height adjustment mechanism 108, as described herein and as depicted in the view of FIG. 4, will cause the front of the top belt frame 120 to be raised or lowered, respectively, as the crank handles 116 are turned clockwise or counter clockwise. Also, differential adjustments of the crank handles 116 will result in fine adjustments of the sideways tilt of the top belt 36 relative to the bottom belt 34. It should also be noted that adjustment of the produce channel height adjustment mechanism will raise or lower a front projection 122 of the top belt 36.

As can be seen in the views of FIGS. 1, 2, 3, and 13, the top belt 36 and the bottom belt are provided with belt rollers 122 about which the belts 34 and 36 rotate in the configuration depicted in FIGS. 3 and 13. The bottom belt 34 is a conventional wire mesh belt such as is commonly used in produce harvesters, and the like, for conveying the crop being harvested. The top belt 36 of the best presently known embodiment 10 of the present invention is a specially made belt, as described herein.

As can be best seen in FIGS. 4 and 6, the top Hula belt 36 comprises an elongated belt base portion 126 (which is a continuous type conveyor belt) with a great number of finger strips or flights 128 attached thereto. The finger strips 128 are constructed from portions of a rubber or plastic material which will not take a memory. It is preferably a thinner material than the belt portion 126. A suitable material is conventional, highly flexible, food grade, ⅛-inch thick, white sheet rubber of 50–70 durometer (e.g., "Boston" #362 sheet of 55–65 durometer sheet rubber from Motion Industries, Inc., Salinas, Calif.). The surface can be smooth or satin. A plurality (the exact quantity determined by the dimensions - as will be discussed hereinafter) of rectangular fingers 130 are cut from each of the finger (flight) strips 128 leaving an uncut foot portion 132 of the flight strip 128 for attachment to the belt base 126. In the best presently known embodiment 10 of the present invention, the finger strips 128 are about 5 inches in length by 1 inch to 1–½ inches in width. Each of the uncut portions 132 of each of the finger flight strips 128 is glued to the belt base 126 of the belt top such that the fingers 130 form rows 128 across the width of the top belt 36, as depicted in the view of FIG. 6. The uncut foot portions 132 are alternated on opposite sides of the flight 128 so the fingers are supported on both sides and are equally flexible both ways. That makes the Hula belt universal; that is, it is neither left nor right-handed, and can be mounted on the rollers either way. The base belt 126 is a standard food grade, white nitrile rubber (such as ³⁄₆₄-inch 2-ply "Chemprene" 90-pound friction surface belting from Motion Industries, Inc., Salinas, Calif.). The finger flights can be the same as the belting material if they do not take a memory. Where the greens are larger, e.g., fully grown spinach, the finger material can be stiffer and/or wider.

As can be seen in the view of FIGS. 1, 8, and 15, the front projection 122 of the top belt 36 is shaped and positioned so as to overhang above and in front of the cutting bar 32 so that the fingers 130 will scoop or gently fold the baby greens 55C onto the bottom belt 34 as the baby greens 55 are cut by the cutting bar 32. As previously discussed herein, the cutting bar 32 is of a two moving blade type which will cleanly cut the baby greens 55 without tearing the baby greens 55 or pulling the baby greens 55 from the field surface 54. In FIGS. 1, 8, and 13, as the fingers 130 of flights 128 descend from the front projection 122, they contact the greens 55U, guide them to the cutter 32 where they are cut, and gathered by the fingers across the bridgeplate 33 (FIG. 8) and thence onto belt 34. Note the cutter bar and bridgeplate assembly 32 is attached to the adjustment mechanism 154 of the lower belt front roller R4 via bracket 156 so that as the front roller is adjusted forward or back, the gap between the bridgeplate and roller is maintained constant.

As best seen in FIG. 11, the top belt 36 and the bottom belt 34 are geared together so that they both move at the same speed relative to each other (±5%) and are coordinated to move at ±15% of the forward ground speed of the harvester (arrow F in FIG. 11). Coordinating the speed of the two belts to each other and to the ground speed is an important aspect of the successful operation of the baby greens harvester of this invention. If the speed of the belts 34 and 36 is too fast, relative to the speed of travel of the baby greens harvester 10 over the field surface 54, the baby greens 55 will be bruised and damaged as the fingers 130 push the baby greens 55 toward the cutting bar 32 before the cutting bar 32 reaches the baby greens 55. Alternatively, if the speed of the belts 34 and 36 is too slow, the baby greens will be allowed to drop straight down onto the cutting bar 32 as the baby greens 55 are cut by the cutting bar 32, thus chewing up the baby greens. The proper speed for the belts 34 and 36 is generally 5% faster than the speed of travel of the greens harvester 10 over the field surface 54 for baby greens harvesting. The cutting bar 32 is commercially available as a Little Wonder™ hedge trimmer cutting bar.

As has been previously mentioned, herein, the best presently known embodiment 10 of the present invention harvester is hydraulically driven. The drive motor 14 (FIG. 11) powers the primary hydraulic pump 50 and an auxiliary hydraulic pump 51, which provide hydraulic power to the baby greens harvester 10, as discussed hereinafter, through hydraulic hoses (some of which are omitted from the drawing to avoid unnecessary complexity which would obscure the pertinent details of the invention), which power the wheels 20 via suitable hub drive motors or transaxles.

FIG. 12 is a schematic diagram of principal portions of the hydraulic drive portions of the baby greens harvester 10. Referring to FIGS. 11 and 12, the auxiliary hydraulic pump 51 selectively operates the cutter/conveyor assembly lifting ram 96 as controlled by a ram control lever 134 which is physically located at the driver's station 16 (FIG. 2). In the forward mode, the externally compensated primary hydraulic pump 50 provides hydraulic motive power to a pair of primary hydraulic drive motors 136L and 136R, with each driving one of the front drive wheels 20. A Forward/Reverse and flow control (slosh plate in motor 14) is linked to and controlled by switch 138 at the driver's station 16 to allow an operator to regulate the direction (Forward/Reverse) and speed of the baby greens harvester 10. In order to prevent differential rotation of the two front drive wheels 20 when it is desired to move the baby greens harvester 10 in a straight line, a 12-volt normally open posi-traction valve 137 is placed between the primary hydraulic pump 50 and the hydraulic drive motors 137. The posi-traction valve is a known device for providing like amounts of hydraulic fluid flow to each of the primary hydraulic drive motors 136. The operator can turn off the posi-traction valve 137 when it is desired to turn the baby greens harvester 10, and it is automatically cut off for Reverse so it acts as a tee for the reverse fluid flow out of the motors to the pump.

As previously discussed herein, it is desirable to have the belts 34 and 36 traveling at generally 5% faster than the speed of the baby greens harvester 10, i.e., over 85% of baby greens can be cut at that ratio. In the best presently known embodiment 10 of the present invention, this is accomplished as follows: A secondary hydraulic pump 140 is driven (by a chain 141) from the right front drive wheel 20. The secondary hydraulic pump 140 provides hydraulic motive power to a belt drive hydraulic motor 142 which drives the belts 34 and 36. The bottom belt 34 drives the top belt 36 through a chain 145 via sprockets on R6, R3, and R5.

As discussed previously herein, the two belts 34 and 36 are mechanically geared together such that only the one belt drive hydraulic motor 142 is required for the two belts 34 and 36. Hydraulic power to a sickle bar motor 148 (for driving the cutting bar 32 shown in FIGS. 1 and 2 through a chain drive 149) and for a conventional power steering control 150 and lift ram control 152 is provided, as depicted in the schematic view of FIG. 12, from the auxiliary hydraulic pump 51.

To Reverse the harvester, the switch 138, via link 139, actuates fluid flow reversal directly to the two-wheel motors, and the return is via the now-inactive, normally open valve 37, as shown by the legends and arrows at the top of FIG. 12.

INDUSTRIAL APPLICABILITY

The harvester can be used in commercial operations, and experimental field tests of prototypes result in increases in production from 3 to 10-fold without bruising and crushing. The shelf life of the baby greens is extended by several days to a week or more in actual tests. Accordingly, the harvester has self-evident industrial applicability. Using the inventive baby greens harvester 10, the baby greens 55 can be cut to within about ¼ inch above the bed 58.

While conventional prior art harvesters were acceptable for harvesting, for example, fully grown spinach (which is cut at heights of 1 inch or greater above the bed 58) can be appreciated that baby greens (which might have a total height of only 3 or 4 inches) could not be effectively machine harvested prior to the present inventive harvester without unduly damaging the product.

In operation, the driver starts the engine, builds up hydraulic pressure in both the main hydraulic pump 50 and the auxiliary pump 51, and raises the entire cutter/conveyor assembly by actuating the lifting ram 96. The harvester is then driven onto a field to be harvestered, with the drive and trailing steering wheels being aligned with the furrow. Steering is actuated by the steering wheel 42, which in turn shunts appropriate hydraulic fluid to the steering ram 48 via control 150 proportionately to the desired angle of steering. The lifting ram is then retracted until slack appears in the ram linkage 98 and the cutter/conveyor is "floating" on the roller 56 and leaf spring 86.

Once the roller is in contact with the bed surface 54, the operator disengages the latch on the cutter bar height adjustment level mechanism 78 and drops the cutter to within approximately ¼ inch of the bed top 54. The flow divider 151 has shunted some of the hydraulic fluid from the auxiliary pump 51 to the cutter bar so the cutter bar is actuated prior to the harvester moving in the forward direction. The operator then engages the forward drive and the cutter moves forward down the bed. Since the conveyors are slaved off the drive wheels via the chain drive 141 and belt pump 140, as the baby greens are cut they are continuously picked up by the lower transfer conveyor 34 and cradled by the upper Hula belt 36, and conveyed to the discharge chute and then sent to the tote place therebeneath. The worker stands on the walkway 19, and places several empty totes on the tote slideway 17, with one tote underneath the chute. When that tote is full, the worker slides an empty tote into place beneath the chute, pushing the full tote to one side at the same time. Then, as the second empty tote is being filled, the first full tote is stacked on the stacking portion of the stacking platform 18b. The driver can adjust the speed of the belt ±5% by the use of the (vernier) control valve 153. This operation continues until the operator reaches the end of the row. The lifting ram is then employed to raise the entire assembly as a U-turn is made. The operator then repeats the process described above, going down subsequent rows until the harvest is completed.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. A harvester for harvesting greens, comprising:
   (a) a reciprocating blade type cutter bar mounted in a position which cuts the greens above the ground surface during harvesting;
   (b) a first, bottom belt for conveying cut greens upwardly from said cutter bar to an elevated packaging station;
   (c) a second, top belt generally opposed to said bottom belt, said top belt includes means for guiding uncut greens to said cutter bar and thereafter to guide cut greens onto said bottom belt and to loosely hold said cut greens on said bottom belt during a portion of its conveying of said cut greens upwardly toward said packaging station; and
   (d) said cutter bar is disposed between a forward most portion of said bottom belt and said top belt.

2. A greens harvester as in claim 1, wherein:
   (a) said top belt cut greens holding means includes a plurality of flexible fingers extending downwardly toward said bottom belt; and (b) said belts are mounted to move in the same direction during conveying said cut greens.

3. A greens harvester as in claim 2, wherein:
(a) the flexible fingers are generally rectangular strips of plastic or rubber material.

4. A greens harvester as in claim 1, wherein:
(a) said top belt and said bottom belt move at ±5% of the same speed such that the greens are not substantially damaged by relative movement between said top belt and said bottom belt.

5. A greens harvester as in claim 1, wherein:
(a) said top belt and said bottom belt move at a speed substantially in a range from 15% less to 15% more than the speed at which the harvester is moving over the ground.

6. A greens harvester as in claim 1, wherein:
(a) said cutter bar has two movable cutting blades.

7. A greens harvester as in claim 1, wherein:
(a) said cutter bar, said bottom belt, and said top belt are rotatably mounted on a cutter/conveyor assembly; and
(b) the cutter/conveyor assembly is supported near a front end by a gauge roller such that said cutter bar may be maintained at a preselected distance above the ground.

8. A greens harvester as in claim 2 wherein:
(a) said top belt is mounted to extend forward of said cutter bar so that said fingers descend into standing uncut greens in a bed before they are cut.

9. A greens harvester as in claim 8 wherein:
(a) said bottom belt diverges from said top belt forward of said packaging station.

10. A greens harvester as in claim 1 wherein:
(a) said cutter bar, said bottom belt, and said top belt are mounted on a cutter/conveyor assembly.

11. A greens harvester as in claim 10, wherein:
(a) the cutter/conveyor assembly is rotatably affixed to a chassis of the harvester near the packaging station such that movement of the cutter/conveyor assembly relative to the chassis produces minimal differential movement between the cutter/conveyor assembly and the packaging station.

12. A greens harvester as in claim 1 wherein:
(a) said bottom belt diverges from said top belt forward of said packaging station.

13. A greens harvester as in claim 10 wherein:
(a) said cutter/conveyor assembly is mounted on a chassis;
(b) said cutter bar is mounted adjacent the forward end of said cutter/conveyor assembly;
(c) said bottom, cut greens conveying belt is rotatably mounted to said cutter/conveyor assembly just rearwardly of said cutter bar;
(d) said top belt is mounted to said cutter/conveyor assembly above and forward of said cutter bar so that said uncut greens guide means descend into standing uncut greens in a bed before they are cut; and
(e) said bottom belt diverges from said top belt ahead of said packaging station.

14. A greens harvester as in claim 10 wherein said cutter/conveyor assembly includes:
(a) a frame having side rails disposed in a generally vertical plane, said side rails being spaced apart a width sufficient to substantially span a width of a greens bed;
(b) a plurality of rollers being journalled in said side rails, said rollers being adapted to retain said first, bottom conveyor belt;
(c) said assembly having a forward and a rearward end;
(d) said cutter bar is mounted at said forward end of said assembly in association with a forward, lower end of said first, bottom conveyor belt;
(e) said first, bottom conveyor belt is a cut greens conveyor belt mounted on and driven about said rollers from said lower forward position to an elevated rearward position, said rearward position comprising a discharge end of said belt;
(f) said second, top belt is rotatably mounted on said cutter/conveyor assembly from a position above and forward of said cutter bar and said bottom conveyor belt to a position above and behind said cutter bar and behind the forward end of said first, bottom, cut greens conveyor belt;
(g) said top belt means for guiding uncut standing greens to said cutter bar and for moving cut greens onto the forward lower end of said bottom belt prevents substantial recutting of stem ends of said greens; and
(h) a means for prouding motive power for driving at least one of said belts.

15. A greens harvester as in claim 14 wherein:
(a) said first, bottom, cut greens conveyor belt and said top belt are mounted generally in parallel along a path of transport of cut greens upwardly from said cutter bar to a point medial of a discharge end of said first, bottom, cut greens belt.

16. A greens harvester as in claim 15 wherein:
(a) said first, bottom, cut greens conveyor belt is mounted on four rollers and includes an inclined section and a rearward horizontal discharge section when in use; and
(b) said top belt is mounted on at least three rollers, said three rollers being disposed at the apices of a triangle with two apices forward of said cutter bar, and the third apex disposed elevated above said first two apices and adjacent a break in said bottom transport belt at the transition between said incline section and said horizontal section.

17. A greens harvester as in claim 14 wherein:
(a) said top uncut greens belt guiding means includes a plurality of flights and each flight comprises a plurality of flexible fingers.

18. A greens harvester as in claim 17 wherein:
(a) the spacing between said belts at said forward end of said assembly does not substantially exceed a height of said top belt fingers to promote the gentle movement of cut greens onto said bottom belt by said top belt upon being cut by said cutter bar.

19. A greens harvester as in claim 18 wherein:
(a) a height of the fingers of said top belt are longer than the distance between the two belts at the forward end of said assembly.

20. A greens harvester as in claim 19 wherein:
(a) said top belt is mounted so that said fingers descend into standing uncut greens in a bed before they are cut, contact said greens to prevent them from falling forward and away from said cutter bar, and retainingly sweep cut greens onto said bottom belt; and
(b) said top and bottom belts diverge at the rearward end of said top belt travel so that the fingers of the top belt are gradually disengaged from said greens on said bottom belt.

21. A greens harvester comprising in operative combination:
(a) a chassis including drive wheels and steerable wheels;

(b) an engine mounted on said chassis for powering said drive wheels;

(c) a cutter/conveyor assembly mounted on said chassis and extending forward of said drive wheels said cutter/conveyor assembly including:
   (i) a cutting bar mounted adjacent the forward end of said assembly in a position which cuts greens above ground during harvesting; and
   (ii) a first conveyor belt mounted rearwardly of said cutter bar to receive greens cut by said cutter bar;
   (iii) a retainer belt having means thereon for retaining cut greens during at least a portion of the distance they are transported upwardly and rearwardly by said conveyor belt without substantial movement of said greens with respect to said conveyor belt; and
   (iv) said cutter bar is disposed between a forwardmost portion of said bottom belt and said top belt; and
   (v) said conveyor belt discharges said cut greens at an elevated, rearward end thereof;

(d) a means for adjusting the height of said cutter bar with respect to a bed on which said greens are growing; and (e) platform means mounted on said chassis for retaining containers of cut greens discharged from said conveyor belt.

22. A cutter/conveyor assembly for a greens harvester comprising in operative combination:

(a) a frame having side rails disposed in a generally vertical plane, said side rails being spaced apart a width sufficient to substantially span the width of a greens bed;

(b) a plurality of rollers being journalled in said side rails, said rollers being adapted to retain a first, bottom conveyor belt and a second top retainer belt;

(c) said assembly having a forward end and a rearward end;

(d) a cutter bar mounted adjacent said forward end of said assembly in a position which cuts greens above around during harvesting;

(e) said first, bottom belt is a cut greens conveyor belt mounted on and driven about said rollers from a lower forward position to an elevated rearward position, said rearward position comprising a discharge end of said belt and said cutter bar is mounted forward of the forwardmost end of said bottom belt;

(f) said second top belt is a greens retaining belt mounted on and driven about a second plurality of said rollers, a forwardmost portion of said second top belt being positioned forward of said cutter bar;

(g) said conveyor belt and said retaining belt are mounted generally in parallel along a path of transport of cut greens upwardly from said cutter bar to a point medial of a discharge end of said first bottom conveyor belt; and (h) motive power means for driving at least one roller for each of said belts.

23. A cutter/conveyor assembly as in claim 22 wherein:

(a) said bottom conveyor belt is mounted on four rollers and includes an inclined section and a rearward horizontal discharge section when in use; and (b) said top retaining belt is mounted on at least three rollers, said three rollers being disposed at the apices of a triangle with two apices forward of said cutter bar, and the third disposed elevated above said first two apices and adjacent a break in said first, bottom conveyor belt at the transition between said incline section and said horizontal section.

24. A cutter/conveyor assembly as in claim 23 wherein:

(a) said to retainer belt includes a plurality of spaced flights and each flight comprising a row of flexible fingers.

25. A cutter/conveyor assembly as in claim 24 wherein:

(a) the spacing between said belts at said forward end of said assembly does not substantially exceed a height of said upper belt fingers.

26. A cutter/conveyor assembly as in claim 24 wherein:

(a) a height of the fingers of the said upper retainer belt are longer than the distance between the two belts at the forward end of said assembly.

27. A cutter/conveyor assembly as in claim 24 wherein:

(a) said top retaining belt is mounted on said rollers so that said fingers descend into standing, uncut greens in a bed before they are cut, contact said bottom belt to form retaining spaces between adjacent flights for maintaining cut greens in a position on said bottom belt, and wherein said top and bottom belts diverge at the rearward end of said cutter/conveyor assembly so that the fingers of the top belt are gradually disengaged from said greens on said bottom belt.

28. A greens harvester comprising in operative combination:

(a) a chassis including drive wheels and steerable wheels;

(b) an engine mounted on said chassis for powering said drive wheels;

(c) a cutter/conveyor assembly pivotally mounted on said chassis to extend with weight cantilevered forward of said drive wheels, which cutter/conveyor assembly includes:
   (i) a reciprocating blade type cutter bar mounted in a position which cuts above round during harvesting and is disposed adjacent the forward end of said cutter/conveyor assembly;
   (ii) a first conveyor belt mounted just rearwardly of said cutter bar to receive greens cut by said cutter bar;
   (iii) endless conveying means having flexible members for retaining cut greens on said first conveyor belt during a portion of the transport of said cut greens on said first conveyor belt upwardly and rearwardly to a discharge end of said conveyor belt;
   (iv) a roller mounted to said assembly forward of said drive wheels and rearwardly of the forward end of said first conveyor belt to support at least a portion of said cantilevered weight of said cutter/conveyor assembly by movement over the top of said bed; and
   (v) means for adjusting the height of said cutter bar above the top of said bed in which said greens are growing, which adjustment means is connected to said roller.

29. A greens harvester as in claim 28 wherein:

(a) said roller is mounted behind said cutter; and (b) said cutter/conveyor assembly cantelevered mounting includes at least one spring member to bear some of the cantelevered weight of said assembly.

30. A greens harvester as in claim 29 wherein:

(a) said cutter/conveyor assembly pivotal connection to said chassis is adjacent a rearward end of said cutter/conveyor assembly.

31. A greens harvester as in claim 30 wherein:

(a) said pivotal mounting includes a yoke permitting both lifting and lowering of the forward end of said assembly, and side to side tilting of said assembly to permit said cutter bar to follow tilted beds.

32. A greens harvester as in claim 30 wherein:

(a) said chassis includes a lifting ram to raise and lower said cutter/conveyor assembly around said pivotal mounting.

* * * * *